United States Patent
Cha et al.

(10) Patent No.: US 8,019,729 B2
(45) Date of Patent: Sep. 13, 2011

(54) SYSTEM AND METHOD FOR UPDATING FILE

(75) Inventors: Myung-Hoon Cha, DaeJeon (KR); Sang-Min Lee, DaeJeon (KR); Young-Kyun Kim, DaeJeon (KR); June Kim, DaeJeon (KR); Myung-Joon Kim, DaeJeon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 450 days.

(21) Appl. No.: 12/187,466

(22) Filed: Aug. 7, 2008

(65) Prior Publication Data

US 2009/0150395 A1 Jun. 11, 2009

(30) Foreign Application Priority Data

Dec. 11, 2007 (KR) .................. 10-2007-0128546

(51) Int. Cl.
*G06F 7/00* (2006.01)
*G06F 17/00* (2006.01)
*G06F 17/30* (2006.01)
(52) U.S. Cl. .................. 707/660; 707/610; 707/822
(58) Field of Classification Search .................. 709/219; 711/123
See application file for complete search history.

(56) References Cited

U.S. PATENT DOCUMENTS

| 5,394,526 | A | * | 2/1995 | Crouse et al. .................. 709/219 |
| 6,138,124 | A | | 10/2000 | Beckhardt |
| 6,549,985 | B1 | * | 4/2003 | Gaskins et al. ............... 711/123 |
| 7,065,618 | B1 | | 6/2006 | Ghemawat et al. |
| 7,526,513 | B2 | * | 4/2009 | Lees et al. .............................. 1/1 |

FOREIGN PATENT DOCUMENTS

| JP | 2002-247508 | 8/2002 |
| JP | 2007-219693 | 8/2007 |
| JP | 2007-316691 | 12/2007 |
| KR | 10-2005-0064278 A | 6/2005 |

OTHER PUBLICATIONS

Korean Office Action dated Jul. 31, 2009 issued in corresponding Korean Patent Application 10-2007-0128546.

* cited by examiner

*Primary Examiner* — Susan Y Chen
(74) *Attorney, Agent, or Firm* — Staas & Halsey LLP

(57) ABSTRACT

Provided is a system and method for updating a plurality of the same files consistently. The file update system comprises a first and a second data servers formed as pipe line type network for storing an original file and a duplicate file of the original file respectively, and for updating both the original file and the duplicate file in response to an update request, wherein the first and the second data servers mutually exchange file update information, correct the file update information so as to prevent overlapped update due to a plurality of update requests for the same file, and then update the original file or the duplicate file according to the corrected file update information.

4 Claims, 6 Drawing Sheets

SYSTEM AND METHOD FOR UPDATING FILE

CROSS-REFERENCE TO RELATED APPLICATIONS

This application claims priority under 35 U.S.C. §119 to Korean Patent Application No. 10-2007-128546, filed on Dec. 11, 2007, the disclosure of which is incorporated herein by reference in its entirety.

BACKGROUND OF THE INVENTION

1. Field of the Invention

The present disclosure relates to a system and method for updating a file, and more particularly, to a system and method for updating a plurality of the same files consistently.

This work was supported by the IT R&D program of MIC/IITA [2007-S-016-01, A Development of Cost Effective and Large Scale Global Internet Service Solution]

2. Description of the Related Art

Integrated storage systems obtained by connecting a plurality of computers through a network provide an integrated storage space to users, and are used in a variety of technical fields such as web searching and super computing. Some integrated storage systems generate a plurality of the same files and store the same files in different storage units in preparation for unexpected damage to an original file, thereby increasing the possibility of restoring the damaged file and also the performance of a plurality of clients reading the same files.

Since the above-described storage system has a plurality of files having the same image, all of the same files must be equally updated when an operation for updating a certain file is requested.

When a file A is stored in data servers D1, D2 and D3 and if update operations 01, 02 and 03 for the file A occur at the same, each of the data servers D1, D2 and D3 must perform the update operations 01, 02 and 03. However, because the data servers D1, D2 and D3 are different from one another, the data server D1 schedules the update operations 01, 02 and 03 in a 01→03→02 order, the data server D2 in a 03→02→01 order, and the data server D3 in a 02→01→03. As a result, the data servers D1, D2 and D3 can have different results after performing the update operations 01, 02 and 03.

U.S. Pat. No. 7,065,618B1, which was invented by Ghemawat, filed by Google inc. on Jun. 30, 2003 and issued on Jun. 20, 2006, discloses a method of managing update operations for the same files stored in a plurality of different computers. In the U.S. Pat. No. 7,065,618B1, a master server managing meta-data selects one of chunk servers storing a file and issues a lease to the selected chunk server, and thus the selected chunk server serves as a primary chunk server and other chunk servers serve as secondary chunk servers that can update the file only under the control of the primary chunk server.

However, in the U.S. Pat. No. 7,065,618B1, an interval exists between transmissions of update data and an update request messages, which are to be transmitted from a client to the chunk servers. Moreover, additional costs are required to issue the lease to the primary chunk server, manage the lease, and restore the primary chunk server when it malfunctions.

U.S. Pat. No. 6,138,124, which was invented by Beckhardt, filed by IBM on Jun. 9, 1998 and issued on Oct. 24, 2000, discloses a method of changing a document in a distributed computing system when the document is duplicated and stored in a plurality of storage units. In the U.S. Pat. No. 6,138,124, one document is divided into a plurality of fields, and there are a document sequence number representing the document and field sequence numbers indicating the respective fields. When a predetermined region of the document is updated, only a corresponding field in each of all the duplicate documents is updated. Thereafter, the document sequence number and the field sequence number of each document are adjusted.

However, the above-described technique can be applied to only a standardized document capable of being divided into fields, and it is difficult to apply the technique to a binary file and a large-capacity file that cannot be divided into a plurality of fields.

SUMMARY

Therefore, an object of the present invention is to provide a file updating system and file updating method in which a data server receiving update requests enables the same files each stored in a plurality of data servers, respectively, to be equally updated without central control.

Another object of the present invention is to provide a file updating system and file updating method in which the number of control messages to be transmitted is reduced and there is no need for a primary data server for controlling other data servers when update operations are performed, thereby improving performance thereof.

To achieve these and other advantages and in accordance with the purpose(s) of the present invention as embodied and broadly described herein, A file update system comprising: a first and a second data servers formed as pipe line type network for storing an original file and a duplicate file of the original file respectively, and for updating both the original file and the duplicate file in response to an update request, wherein the first and the second data servers mutually exchange file update information, correct the file update information so as to prevent overlapped update due to a plurality of update requests for the same file, and then update the original file or the duplicate file according to the corrected file update information.

To achieve these and other advantages and in accordance with the purpose(s) of the present invention, A file updating method for storing an original file and a duplicate file of the original file respectively in a plurality of data servers connected as a network shaped like pipe line, and updating the original file and the duplicate file of the original file so as to become the same image of the original file as the duplicate file, the method comprising: receiving the file update information in response to a plurality of update requests for the original file; updating the original file or the duplicate file based on the changed file update information after determining file update order based on the update requests and changing the file update information according to the file update order so as not to update the same file as the updated file due to a plurality of update requests.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF EMBODIMENTS

A file updating system and method disclosed here are provided to allow the same files to be equally updated in an environment in which a plurality of storage units is connected through a network and the same files are stored respectively in the storage units.

Hereinafter, specific embodiments will be described in detail with reference to the accompanying drawings, and focused on the matters necessary to understand operations and processes according to the present invention.

Specific details on a file updating system and method according to the present invention will be described to provide more general understandings of the present invention. However, it is obvious to those skilled in the art that the present invention can be implemented even without the specific details, or with various modifications thereof.

Figure 1:
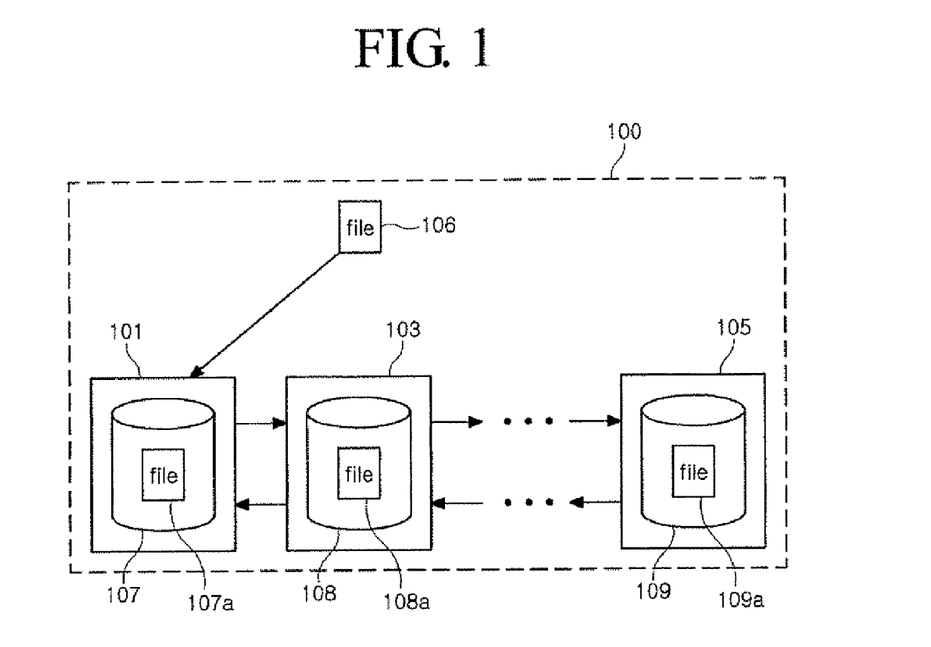
FIG. 1 is a block diagram of a file updating system according to an embodiment of the present invention.

FIG. 1 is a block diagram of a file updating system according to an embodiment of the present invention. Referring to FIG. 1, a first file 106 is duplicated and stored in a first data server 101, a second data server 103, and a third data server 105, respectively.

A file updating system 100 includes the first to third data servers 101 to 105.

The first to fourth files 106, 107a, 108a and 109a are the same. That is, the first to third data servers 101, 103 and 105 store the duplicate files as the second to fourth files 107a to 109a, respectively.

When a client wishes to store the first file 106 as an original file, the first file 106 is duplicated and stored in the first to third data servers 101 to 105, respectively. Each of the second to fourth files 107a to 109a stored in the first to third data servers 101 to 105, respectively, has the same image.

As described above, one file is duplicated a plurality of times and stored in a plurality of data servers, thereby increasing restoration possibility when the file is damaged and also improving the performance of a plurality of clients reading one file.

Hereinafter, a file storing process in the file updating system 100 will be described.

When a client transmits a content of the first file 106 to be duplicated to the first data server 101, the first data server 101 receives the content of the first file 106 and stores it as the second file 107a into a local storage unit 107. Then, the first data server 101 transmits a content of the second file 107a to the second data server 103 in a pipeline mode.

The second data server 103 receives the content of the second file 107a and stores it as the third file 108a into a local storage unit 108. The second data server 103 transmits a content of the third file 108a to the third data server 105 that is located behind the second data server 103 on a pipeline path. The third data server 105 receives the content of the third file 108a and stores it as a fourth file 109a into a local storage unit 109, and then the third data server 105 transmits a message, which indicates that a storage process in the fourth file 109a is completed, to the second data server 103.

Thereafter, the second data server 103 transmits a message, which indicates that a storage process in the third file 108a is completed, to the first data server 101 that is located ahead of the second data server 103 on the pipeline path. The first data server 101 receiving the message from the second data server 103 transmits a message, which a storage process of the second file 107a is completed, to the client.

As described above, when a pipeline mechanism is applied to the file updating system 100, one file can be efficiently duplicated and stored in a plurality of data servers, respectively.

When a file is stored in a plurality of data servers, respectively, by a request from the client, the priority order among the data servers (hereinafter, referred to as a pipeline order) is generally determined by a meta-data server. However, the client or the data server may determine the pipeline order. Since a determination method of the pipeline order is general technique, detailed description will be omitted.

Figure 2:
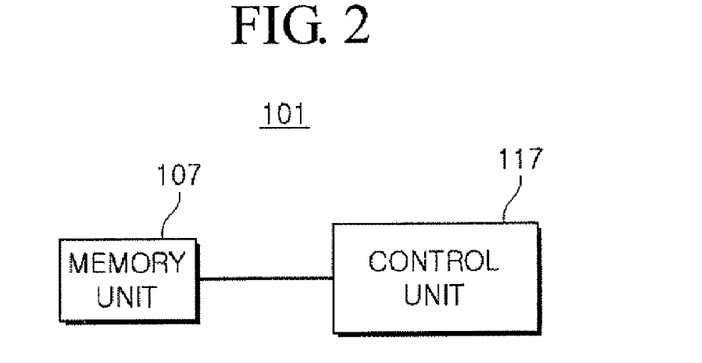
FIG. 2 is a block diagram of a data server illustrated in FIG. 1.

Each of the first to third data servers 101 to 105 includes a memory unit 107 and a control unit 117 as illustrated in FIG. 2.

The memory unit 107 may include a program memory and a data memory. The program memory includes a program that determines the execution priority order among a plurality of update requests for the same file (hereinafter, referred to as a file update order). Also, the program memory includes a program that changes file update information when a plurality of update requests is received. The data memory stores temporary data generated during the execution of the program. Also, the data memory stores a file updated by one or more update requests and a temporary file.

The control unit 117 controls the overall operation of the data server. Also, the control unit 117 generates a temporary file in respond to an update request. In addition, the control unit 117 updates an original file using the temporary file according to the file update order. Also, when a plurality of update requests for the same file is received, the control unit 117 determines the priority order among the update requests and updates the target file after changing file update information contained in each of the update requests so as to prevent collision among the update requests. The file update information includes offset and length information.

Figure 3:
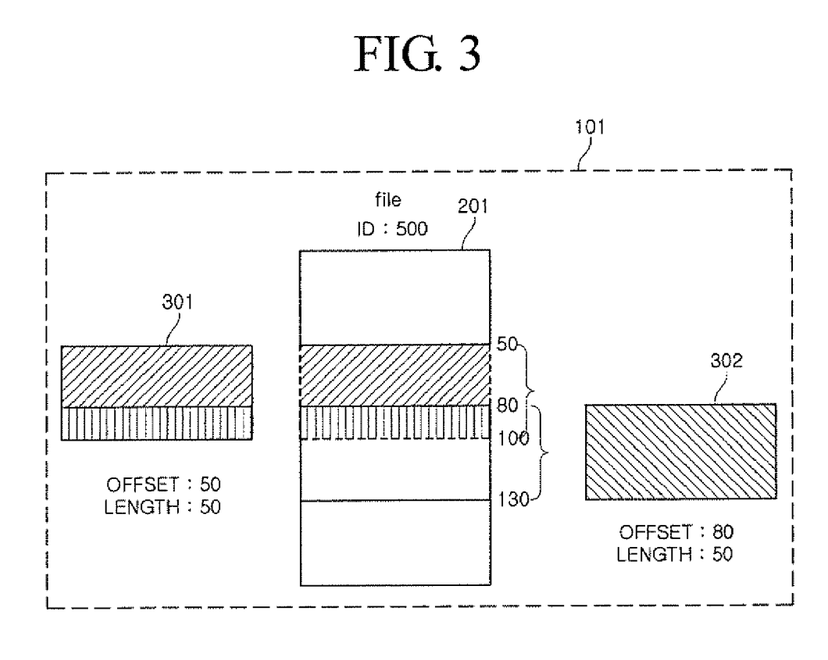
FIG. 3 is a block diagram illustrating a file updating operation of the data server illustrated in FIG. 1.

FIG. 3 is a block diagram illustrating a file updating of the data server illustrated in FIG. 1.

Referring to FIG. 3, when the data server 101 stores a file 201, the data server 101 receives a first request and a second request, simultaneously. The first request requests updating of 50 bytes region at the 50th offset in the file 201 and the second request requests updating of 50 bytes region at the 80th offset in the file 201. It is assumed that a first temporary file 301 indicates data of a first region to be updated in respond to the first request and a second temporary file 302 indicates data of a second region to be updated in response to the second request.

The control unit 117 of the data server 101 recognizes that the first and second requests exist, determines that the first request will be processed before the second, and prepares for updating the file 201 in consideration of an overlapping region of the first and second requests.

Specifically, the control unit 117 changes length of the first request from 50 to 30 in order to update only once the overlapping region of the first and second requests, i.e., a region of from 80th offset to 100th, in the file 201 with a file identification (ID) of 500. A process for changing the length of the first request will be described below in detail. Thereafter, the control unit 117 updates a region of from 50th offset to 80th in the file 201 using the first temporary file 301 in reply to the first request, and updates a region of from 80th to 130th in the file 201 using the second temporary file 302 in reply to the second request. The control unit 117 temporarily stores the first and second temporary files 301 and 302 related to the first and second requests into a memory unit 107, and deletes the first and second temporary files 301 and 302 after updating the file 201.

Figure 4A:
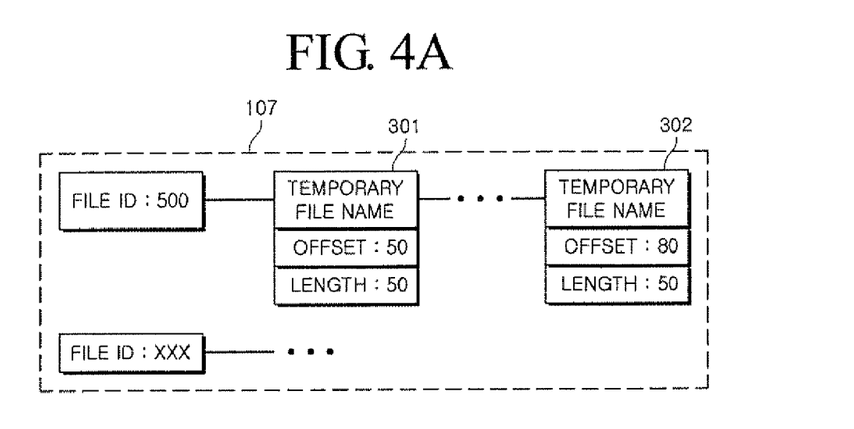
FIGS. 4A and 4B are block diagrams illustrating a change in file update information of first and second temporary files illustrated in FIG. 3.
Figure 4B:
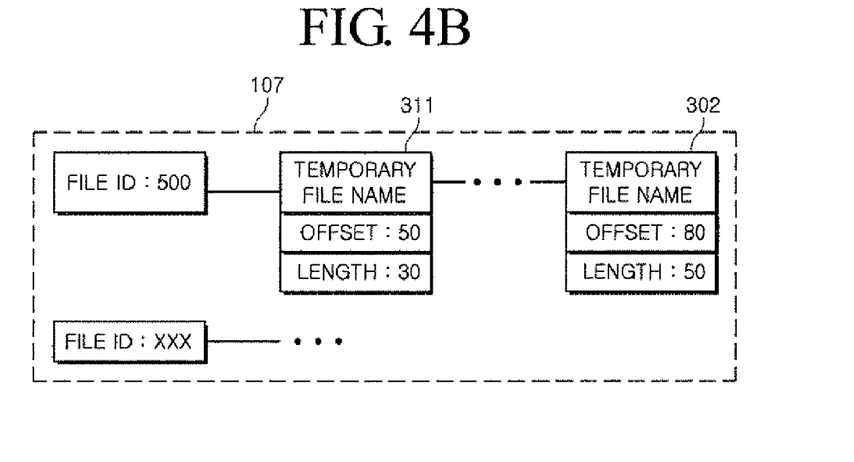

FIGS. 4A and 4B are block diagrams illustrating change of file update information of the first and second temporary files 301 and 302 of FIG. 3. That is, FIGS. 4A and 4B are block diagrams illustrating change in data structures of the first and second temporary files 301 and 302.

The control unit 117 recognizes two or more update requests, i.e., the first and second requests, for the file 201 with the file ID of 500, stores the first and second temporary files 301 and 302 corresponding to the first and second requests, respectively, into the memory unit 107, and determines the priority order among the first and second requests.

When it is determined that the first temporary file 301 will be processed before the second temporary file 302 according to the priority order of the first and second requests, the control unit 117 compares offsets and lengths in the first and second temporary files 301 and 302. Then, the control unit 117 changes the offset and length of the first temporary file 301 into an offset and length of a third temporary file 311, i.e., offset: 50, length: 30, in order that a region processed by a first update operation according to the first temporary file 301 may not be further processed by a second update operation according to the second temporary file 302.

In other words, the control unit 117 updates a region of the file 201 corresponding to the third temporary file 311 instead of a region corresponding to the first temporary file 301, and then updates a region corresponding to the second temporary file 302. These temporary files may be implemented using a hash table or the like.

Figure 5:
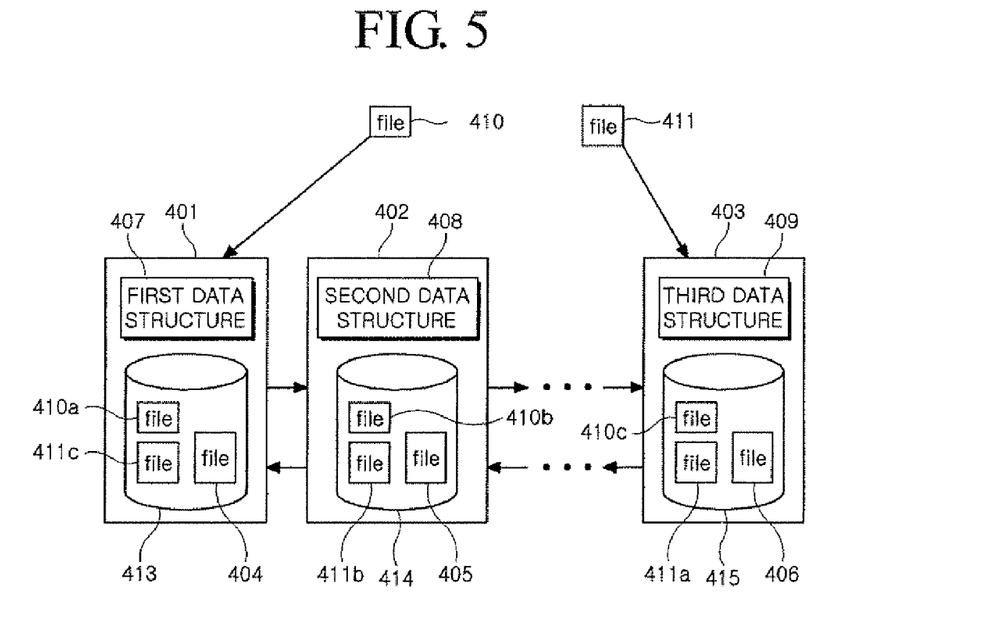
FIG. 5 is a diagram illustrating a file updating operation of the file updating system according to the embodiment of the present invention.

FIG. 5 is a diagram illustrating a file updating operation of the file updating system 100 according to the embodiment of the present invention. Referring to FIG. 5, there are illustrated a first file 410 from a first client for updating first predetermined regions of original files 404, 405, and 406 and a second file 411 from a second client for updating second predetermined regions of the original files 404 to 406. First to third data structures 407 to 409 may be stored in first to third memories 413 to 415 of first to third data servers 401 to 403, respectively.

The first client requests the first to third data servers 401 to 403 to update the same original files 404 to 406 using the first file 410. The first file 410 is transmitted in a predetermined pipeline order (401→402→403). The second client requests them to update the same original files 404 to 406, which the first client wants to update, using the second file 411. The second file 411 is transmitted in a predetermined pipeline order (403→402→401).

When the first to third data servers 401 to 403 receive the first and second files 410 and 411, the first to third data servers 401 to 403 generate and store first temporary files 410a to 410c and second temporary files 411a to 411c separated from the same original files 404 to 406, respectively.

For instance, when the first data server 401 receives the first file 410 for update, it stores an offset, length, and the like of the first file 410 into the data structure 407 in a format as illustrated in FIGS. 4A and 4B, and generates the first temporary file 410a.

When the first data server 401 receives the second file 411 through the third and second data servers 403 and 402 according to the pipeline order, it stores an offset, length, and the like of the second file 411 into the data structure 407, and generates the second temporary file 411c.

Thereafter, the first to third data servers 401 to 403 change the offset and length based on the data structures 407 to 409 so as to prevent regions to be updated from being overlapped to each other, and update predetermined regions of the original files 404 to 406 using the first and second temporary files 410a to 410c and 411a to 411c.

Since update operations are performed according to an offset and length changed according to a predetermined pipeline order, though the update operations are performed in different sequences in the first to third data servers 401 to 403 due to scheduling in a control unit (not shown), each of the first to third servers 401 to 403 obtains the same result after performing the update operations.

For instance, though a CPU of the first data server 401 of FIG. 5 determines that the first temporary file 410a will be processed before the second temporary file 411c, and a CPU of the third data server 403 determines that the first temporary file 410c will be processed before the second temporary file 411a, it is decided based on a predetermined reference that the first file 410 will be processed before the second file 411 in the first to third data servers 401 to 403, and offsets and lengths related to update operations to be performed are changed according to the above described processing order, so that each of the data servers 401 to 403 obtains the same result.

Figure 6A:
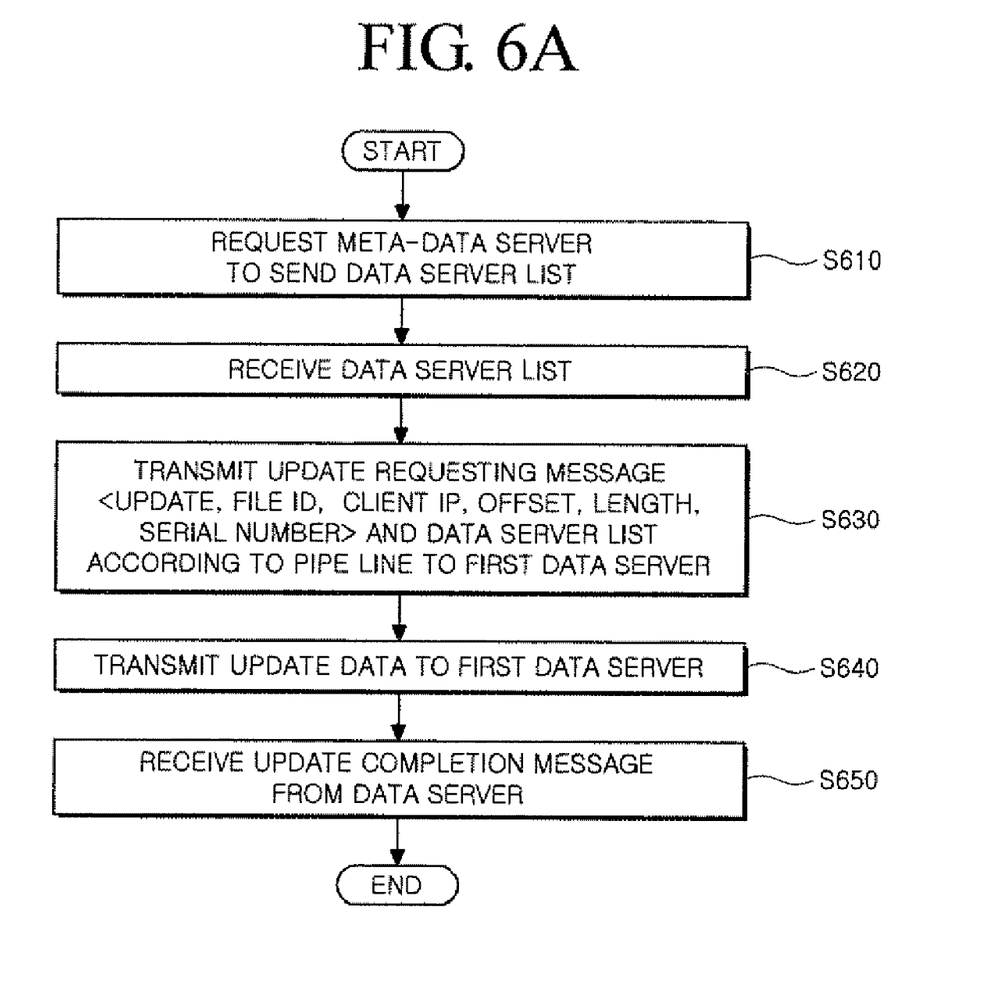
FIGS. 6A through 6C are flowcharts illustrating a file updating method according to an embodiment of the present invention.
Figure 6B:
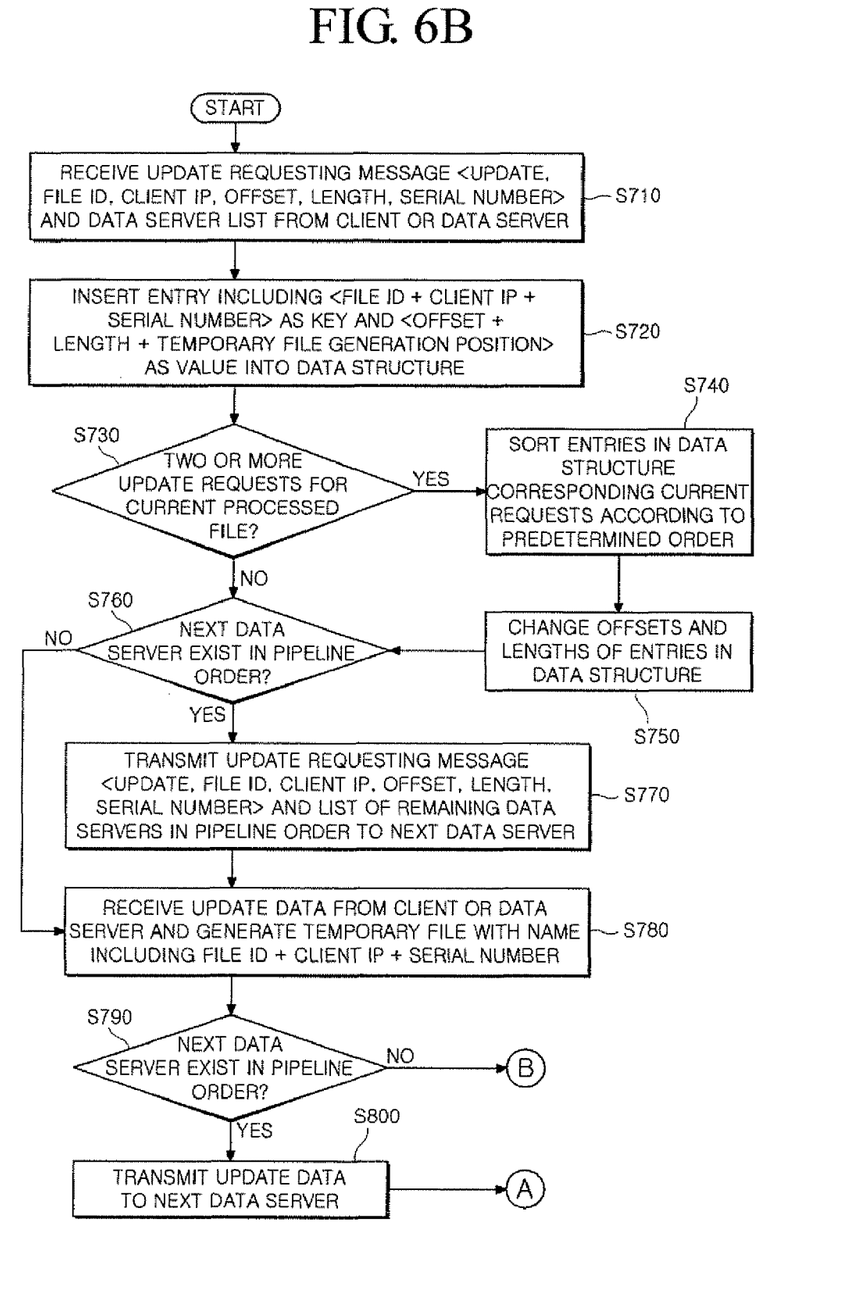
Figure 6C:
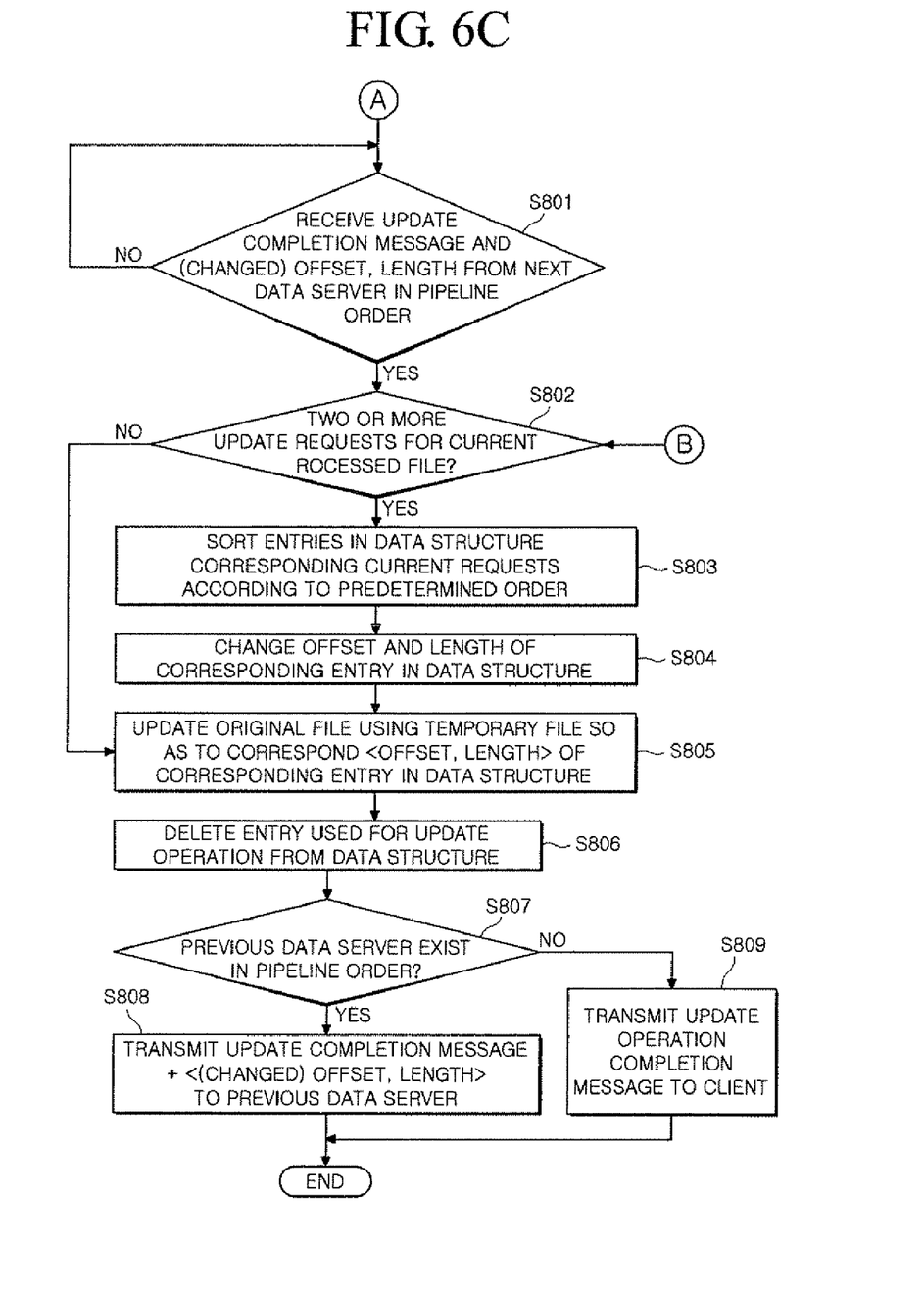

FIGS. 6A through 6C are flowcharts illustrating a file updating method according to an embodiment of the present invention. FIG. 6A is a flowchart of a method for requesting update operations in a client. FIG. 6B is a flowchart of a method for updating a file in a data server.

Firstly, in operation S610 a client requests a meta-data server to send a list of data servers storing an original file to be updated (hereinafter, as referred to as a data server list).

In operation S620, the client receives the data server list from the meta-data server. The order of the data servers shown in the data server list may be used when the client transmits messages and data to the data servers in a pipeline mode. An order of the data servers may be determined by the meta-data server and transmitted to the client, or determined by the client that receives the data server list from the meta-data server.

In operation S630, the client transmits an update requesting message and a data server list to a first data server of a pipeline order, wherein the data server list includes the data servers that store the file to be updated and are arranged in the pipeline order. The update requesting message includes update requesting information for indicating a message type, the file ID of the file to be updated, a client's address, the offset of a region to be updated, the length of the region to be updated, a serial number. The client's address and the serial number of the update requesting message are used to distinguish a plurality of update requesting messages for the same file in a data structure that is managed by the data server.

For instance, a data server receives three update requesting messages for an original file with a file ID of 500 simultaneously. One of the three update requesting messages includes information of <client: A, serial number: 100>, another includes <client: A, serial number: 101>, and the other includes <client: B, serial number: 100>. Using information on client and serial number, the data server can distinguish the three requesting messages in a data structure to be managed by the data server. A client may generate the serial number, or a meta-data server may generate the serial number firstly and transmit the generated serial number to the client.

Thereafter, in operation S640, the client transmits a file used to update the original file (hereinafter, referred to as an update file) to the first data server In operation S650 receives from the first data server a message indicating that updating of the original file is completed.

The data servers update a predetermined region of the original file to be updated by performing a process of FIG. 6B in respond to the client's request for updating the original file as illustrated in FIG. 6A.

In operation S710, the data server receives the update requesting message from the client or the immediately previous data server according to its position in the pipeline order. In operation S720, the data server inserts an entry into the data structure, wherein the entry includes <file ID+client's address+serial number> as a key and <first offset in a region to be updated, length of the region to be updated, position of temporary file to be generated> as a value. The entry may use other elements instead of the <file ID+client's address+serial number> as the key. In order to search the key, another data structure may be generated using the file ID. The first data server in the pipeline order receives the update requesting message from the client, each of the data servers except for the first data server receives the update requesting message from the immediately previous data server. However, the data servers do not receive the update requesting message at the same time. That is, the data server, except for the first data server, cannot receive the update requesting message until the immediately previous data server transmits the message to itself.

In operation S730, the data server determines whether there is a plurality of update requests for the same file with reference to the data structure.

In operation S740, when there is a plurality of update requests, the data server arranges the update requests in a predetermined order. In operation S750, the data server changes offsets and lengths of the update requests so as to prevent that regions to be updated are not overlapped. That is, the offsets and lengths of the update requests are changed in order that the data server may obtain the same result though processes or threads that are scheduled in any predetermined order. In each of the data servers, a result of arranging the update requests must be the same.

For instance, when the first data server receives a plurality of update requests for the same file in A→C→B and the second data server receives the update requests for the same file in B→A→C, if the first data server arranges the update requests in A→B→C, the second data server also must arrange the update requests in A→B→C. The update requests can be arranged in various manners and methods.

For instance, the data structure managing update operations can arrange the update operations in an ascending order or descending order based on <file ID+client's address+serial number> used as the key.

In operation S760, the data server determines whether a next data server in the pipeline order exists.

In operation S770, when the next data server exists, the data server transmits to the next data server the update requesting message and a data server list containing remaining data servers. Particularly, initial values firstly received in the data server such as <offset of a region to be updated and length of the region to be updated> are changed through the operation S750, the data server transmits the changed offset and length to the next data server. If <offset of a region to be updated and length of a region to be updated> are not changed through the operation S750, the data server transmits an initial offset and length to the next data server.

In operation S780, the data server receives actual data for updating the original file (hereinafter, referred to as update data) from the client or the immediately previous data server according to its position in the pipeline order, and then it generates a temporary file with a name such as <file ID, client's address, serial number>. Specifically, the first data server in the pipeline order receives the update data and each of the other data servers except for the first data server, receives the update data from the immediately previous data server. However, the data servers do not receive the update data at the same time. That is, the data server, except for the first data server, cannot receive the update data until the immediately previous data server transmits the data to itself.

In operation S790, the data server determines whether a next data server exists on the pipeline path. In operation S800, when the next data server exists, the data server transmits the update data to the next data server. In operation S810, after performing the operation S800, the data server receives a message including <completion of update operation+ (changed) offset+(changed) length> from the next data server. However, when the next data server in the pipeline order does not exist in the operation S790, or the data server receives the message including <completion of update operation+(changed) offset+(changed) length> from the next data server in the operation S801, the data server determines that a plurality of update requests for the same file exists with reference to the data structure in operation S802.

In operation S803, when a plurality of update requests exists, the data server arranges the update requests in a predetermined order. In operation S804, the data server changes offsets and lengths of the update requests in order to prevent that regions to be updated are not overlapped.

In operation S805, the data server updates the original file using the temporary file to correspond an offset and length of a related entry in the data structure. In operation S806, the data server deletes the related entry in the data structure.

In operation S807, the data server determines whether a previous data server in the pipeline order exists.

In operation S808, when the previous data server exists, the data server transmits a message including <completion of update operation+(changed) offset+(changed) length> to the previous data server. In operation S809, when the previous data server does not exist, the data server transmits a message indicating completion of update operation to the client. However, each of the data servers, except for the client, receives the message indicating <completion of update operation+ (changed) offset+(changed) length> from the immediately next data server in the operation S801.

As described above, the data server processes a plurality of update requests for the same file, so that all updated files can have the same image. Particularly, in a related art storage system, a meta server plays an important role in performing update operations, but in the above described storage system, the control of the meta server is not required, thereby eliminating load on the meat server.

Also, it is not need for a primary data server assigned with a lease to control update operations, so that anyone of data servers storing the file to be updated is selected, the update operations can be performed in the selected data server though the selected data server is not the primary data server. Moreover, delay in transmitting of control messages required before performing of the update operations can be minimized and thus overall performance of the storage system can be improved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A file update system, comprising:
    a first and a second data server computers formed as pipe line type network for storing an original file and a duplicate file of the original file respectively, and for updating both the original file and the duplicate file in response to an update request, the update request includes update request information for indicating a message type, a file ID of the file to be updated, a client's IP address, an offset of a region to be updated, a length of the region to be updated and a serial number;
    wherein the client's IP address and the serial number are used to distinguish a plurality of update requesting messages for a same file in a data structure that is managed by the data servers;
    wherein the first and the second data server computers mutually exchange file update information, correct the file update information so as to prevent overlapped update due to a plurality of update requests for the same file, and then update the original file or the duplicate file according to the corrected file update information,
    wherein the first and the second data server computers comprise:
        a memory for storing the original file and the duplicate file; and
        a control unit for changing the file update information according to a plurality of update data for the same file in case of the file update request, and updating the file update information of the original file or the duplicate file corresponding to the same file,
    wherein the control unit updates the original file or the duplicate file as the control unit changes offsets and lengths of the update requests in consideration of the file update order and the file update information according to the update requests so as to prevent that regions of the original file to be updated are not overlapped.

2. A file update system, comprising:
    a first and a second data server computers formed as pipe line type network for storing an original file and a duplicate file of the original file respectively, and for updating both the original file and the duplicate file in response to an update request, the update request includes update request information for indicating a message type, a file ID of the file to be updated, a client's IP address, an offset of a region to be updated, a length of the region to be updated and a serial number;
    wherein the client's IP address and the serial number are used to distinguish a plurality of update requesting messages for a same file in a data structure that is managed by the data servers;
    wherein the first and the second data server computers mutually exchange file update information, correct the file update information so as to prevent overlapped update due to a plurality of update requests for the same file, and then update the original file or the duplicate file according to the corrected file update information,
    wherein the file update information comprises an offset and length in regard to an identification (ID) of the original file to be updated.

3. A file updating method for storing an original file and a duplicate file of the original file respectively in a plurality of data server computers connected as a network shaped like pipe line, and updating the original file and the duplicate file of the original file so as to become the same image of the original file as the duplicate file, the method comprising:
    receiving the file update information in response to a plurality of update requests for the original file by one of the data server computers, wherein the update request includes update request information for indicating a message type, a file ID of the file to be updated, a client's IP address, an offset of a region to be updated, a length of the region to be updated and a serial number;
    wherein the client's IP address and the serial number are used to distinguish a plurality of update requesting messages for a same file in a data structure that is managed by the data servers;
    updating the original file or the duplicate file based on the changed file update information after determining file update order based on the update requests and changing the file update information according to the file update order so as not to update the same file as the updated file due to a plurality of update requests,
    wherein the updating of the original file comprises:
        determining whether regions of the original file to be updated are overlapped;
        changing offsets and lengths of the update requests so as to prevent that the regions are overlapped;
        generating temporary files corresponding to the update requests;
        exchanging, in the data servers, the changed offsets and lengths according to a pipeline order; and
        updating the original file using the temporary files according to the changed offsets and lengths.

4. A file updating method for storing an original file and a duplicate file of the original file respectively in a plurality of data server computers connected as a network shaped like pipe line, and updating the original file and the duplicate file of the original file so as to become the same image of the original file as the duplicate file, the method comprising:
    receiving the file update information in response to a plurality of update requests for the original file by one of the data server computers, wherein the update request includes update request information for indicating a message type, a file ID of the file to be updated, a client's IP address, an offset of a region to be updated, a length of the region to be updated and a serial number;
    wherein the client's IP address and the serial number are used to distinguish a plurality of update requesting messages for a same file in a data structure that is managed by the data servers;
    updating the original file or the duplicate file based on the changed file update information after determining file update order based on the update requests and changing the file update information according to the file update order so as not to update the same file as the updated file due to a plurality of update requests,
    wherein the file update information comprises an offset and length in regard to an identification (ID) of the original file to be updated.

* * * * *